US011350007B2

(12) United States Patent
Kobayashi

(10) Patent No.: US 11,350,007 B2
(45) Date of Patent: May 31, 2022

(54) IMAGE READING APPARATUS, IMAGE PROCESSING METHOD, AND STORAGE MEDIUM FOR CORRECTING SHOW-THROUGH

(71) Applicant: CANON KABUSHIKI KAISHA, Tokyo (JP)

(72) Inventor: Masato Kobayashi, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/694,988

(22) Filed: Nov. 25, 2019

(65) Prior Publication Data
US 2020/0186663 A1   Jun. 11, 2020

(30) Foreign Application Priority Data
Dec. 7, 2018 (JP) .............................. JP2018-229970

(51) Int. Cl.
*H04N 1/00* (2006.01)
*G06F 3/12* (2006.01)
*H04N 1/60* (2006.01)

(52) U.S. Cl.
CPC ....... *H04N 1/00816* (2013.01); *G06F 3/1206* (2013.01); *G06F 3/1243* (2013.01); *G06F 3/1254* (2013.01); *H04N 1/00806* (2013.01); *H04N 1/6008* (2013.01)

(58) Field of Classification Search
CPC ........... H04N 1/00816; H04N 1/00806; H04N 1/6008; H04N 1/4095; G06F 3/1243; G06F 3/1206; G06F 3/1254
See application file for complete search history.

(56) References Cited

U.S. PATENT DOCUMENTS

| 6,621,595 B1* | 9/2003 | Fan ...................... H04N 1/4095 358/2.1 |
| 2003/0175501 A1* | 9/2003 | Concannon .............. B41M 5/52 428/327 |
| 2007/0171192 A1* | 7/2007 | Seo ................... H04M 1/72427 345/156 |
| 2009/0262402 A1* | 10/2009 | Fan ...................... H04N 1/4095 358/488 |
| 2013/0063736 A1* | 3/2013 | Chiba ..................... G06T 11/60 358/1.6 |
| 2013/0135700 A1* | 5/2013 | Tamura ................ H04N 1/4095 358/448 |
| 2013/0301067 A1* | 11/2013 | Nakamura ........... H04N 1/4095 358/1.13 |
| 2015/0256715 A1 | 9/2015 | Ikari |
| 2015/0373227 A1* | 12/2015 | Ikari .................... H04N 1/4095 358/2.1 |
| 2016/0006891 A1* | 1/2016 | Hattori ............... H04N 1/00973 358/1.15 |
| 2017/0272612 A1* | 9/2017 | Shijoh ................ H04N 1/00816 |

FOREIGN PATENT DOCUMENTS

| JP | 2004-96245 A | 3/2004 |
| JP | 2015-171099 A | 9/2015 |

* cited by examiner

*Primary Examiner* — Juan M Guillermety
(74) *Attorney, Agent, or Firm* — Canon U.S.A., Inc. IP Division

(57) ABSTRACT

An image processing method includes correcting a show-through of a document image, and setting a document type, wherein a correction amount for the document image is changed based on the set document type.

14 Claims, 9 Drawing Sheets

FIG.6A COPY SETTING

FIG.6B DOCUMENT CONTENT

FIG.6C SHOW-THROUGH REMOVAL

FIG.6D COPY SETTING

FIG.6E PAPER THICKNESS OF READ DOCUMENT

IMAGE READING APPARATUS, IMAGE PROCESSING METHOD, AND STORAGE MEDIUM FOR CORRECTING SHOW-THROUGH

BACKGROUND

Field of the Disclosure

The present disclosure relates to an image reading apparatus that corrects a show-through of an image of a document, an image processing method, and a storage medium.

Description of the Related Art

In a case where a document having an image on each side is read, a phenomenon in which the image on the backside of the document is seen through on the front side of the document may occur. Such a phenomenon is called "show-through". If the show-through occurs, the appearance of the image on the front side of the document changes, and thus it is desirable that the influence of the show-through is small.

Japanese Patent Application Laid-Open No. 2015-171099 discusses a method of detecting an area where a show-through is present, and correcting the show-through by correcting the area where the show-through is present.

Further, Japanese Patent Application Laid-Open No. 2004-96245 discusses a technique that a user changes a correction amount for a show-through using an operation unit.

Types of document image include a type mainly including text, a type including a mixture of text and a photographic image, and a type only including a photographic image. Text is less likely to be affected by show-through correction. Accordingly, for a document mainly including text, it is possible to reduce the influence of a show-through without greatly reducing the quality of the text, by increasing a correction amount for the show-through. In contract, a picture is easily affected by show-through correction. Thus, if a correction amount for a document of a printing paper picture is excessively increased, image quality declines. As for the document mainly including text, if the correction amount for the show-through is excessively decreased not to reduce image quality, the influence of the show-through cannot be sufficiently reduced.

Conventionally, a user can set a correction amount for a show-through using an operation unit. However, in order to set an appropriate amount of correction of a show-through with respect to the type of an image of a document, the user is expected to recognize the above-described relationship between the type of document image and the show-through.

SUMMARY

According to some embodiments, an image reading apparatus includes a reading unit configured to read a document image, a correction unit configured to correct a show-through of the document image read by the reading unit, and a setting unit configured to set a type of document image, wherein the correction unit changes an amount of correction for the document image, based on the type of document image set by the setting unit.

Further features of various embodiments will become apparent from the following description of exemplary embodiments with reference to the attached drawings.

BRIEF DESCRIPTION OF THE DRAWINGS

FIGS. 6A, 6B, 6C, 6D, and 6E each illustrate a conceptual user interface (UI) for copy setting.

DESCRIPTION OF THE EMBODIMENTS

Exemplary embodiments will be described below with reference to the drawings. Components described in the exemplary embodiments are just examples and are not intended to limit the scope of every embodiment to those examples.

In a first exemplary embodiment, a multifunctional peripheral (MFP) will be described as an example of an image reading apparatus.

Figure 1:
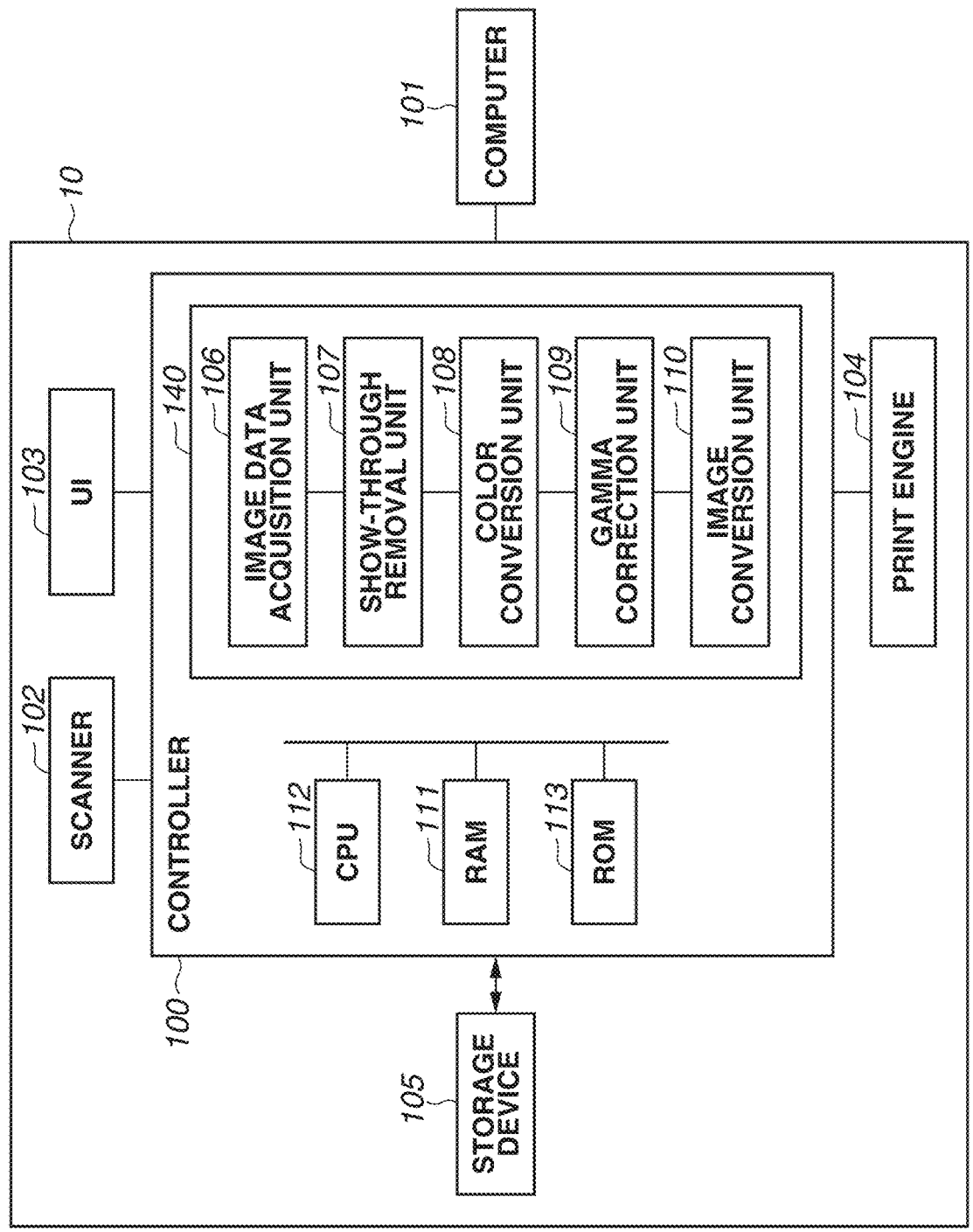
FIG. 1 is a block diagram illustrating a configuration of an image processing apparatus.

FIG. 1 is a block diagram illustrating an example of a configuration of a system according to the present exemplary embodiment.

An MFP 10 has a controller 100, a scanner 102, a print engine 104, a user interface (UI) 103, and a storage device 105. The MFP 10 is connected to an external computer 101 via a network or other connection, such as a Universal Serial Bus (USB) cable. Other than the computer 101, a plurality of computers may be connected to (e.g., via the network), and be able to communicate with, the MFP 10.

The controller 100 includes a central processing unit (CPU) 112, a random access memory (RAM) 111, a read only memory (ROM) 113, and an image processing unit 140.

Further, the controller 100 is connected to the scanner 102, the UI 103, the print engine 104, and the storage device 105.

The scanner 102 reads an image of a document. The scanner 102 can read a document placed on a platen glass. When reading an image on each side of a document placed on the platen glass, the scanner 102 reads the image on a first face of the document and reads the image on a second face of the document turned upside down by a user. Further, the scanner 102 has an automatic document conveyance device (not illustrated). The scanner 102 feeds documents loaded in the automatic document conveyance device one by one, and reads an image on each side of the fed document in one conveyance process.

The UI 103 displays an operation screen for operating the MFP 10, displays a status of the MFP 10, and receives an operation from the user.

The print engine 104 feeds sheets from a feed cassette and prints an image on the fed sheet.

The storage device 105 stores data and a program, and is, for example, a hard disk drive (HDD).

In the present exemplary embodiment, the MFP is described as an example of the image reading apparatus, but an example of the image reading apparatus may be a scanner apparatus having a scanner but having no print engine.

The image processing unit 140 includes an image data acquisition unit 106, a show-through removal unit 107, a color conversion unit 108, a gamma correction unit 109, and an image conversion unit 110.

The image data acquisition unit 106 acquires RGB image data generated from a document read by the scanner 102. The RGB image data is 8-bit data in which each of R, G, and B has a value of 0 to 255. However, the image data is not limited to the 8-bit data, and may be 10-bit or 16-bit RGB data. In the present exemplary embodiment, the RGB image data is described as an example, but other type of image data may be used if the image data is data having a color space that can be converted into a CMYK space to be described below. Further, the image data acquisition unit 106 acquires setting values related to, for example, a type of document image and a show-through removal intensity that are set in the UI 103.

The show-through removal unit 107 performs processing on a show-through area of the RGB image data input from the image data acquisition unit 106, and generates the RGB image data from which a show-through has been removed. The show-through removal will be described in detail below.

The color conversion unit 108 converts each pixel value of the RGB image data generated by the show-through removal unit 107 into a corresponding CMYK value, and generates CMYK image data. In general, interpolation calculation using a look up table (LUT) is used for conversion of each pixel from RGB into CMYK, but any method may be used if the method can convert a predetermined RGB value into a CMYK value corresponding to a printer.

The gamma correction unit 109 performs correction processing on the CMYK image data sent from the color conversion unit 108, for keeping tone characteristics in the print engine 104 constant.

The image conversion unit 110 controls conversion of the CMYK image data corrected by the gamma correction unit 109 into N-bit (N: an integer) half-tone image data suitable for the printer, and transmission of the half-tone image data to the print engine 104. There are various techniques, such as a density pattern method, a systematic dither method, and an error diffusion method, for the halftone processing, and any technique may be employed in the present exemplary embodiment. The present exemplary embodiment will be described below employing an engine using CMYK toner as the print engine 104, but an engine using CMYK ink may be employed.

Figure 2:
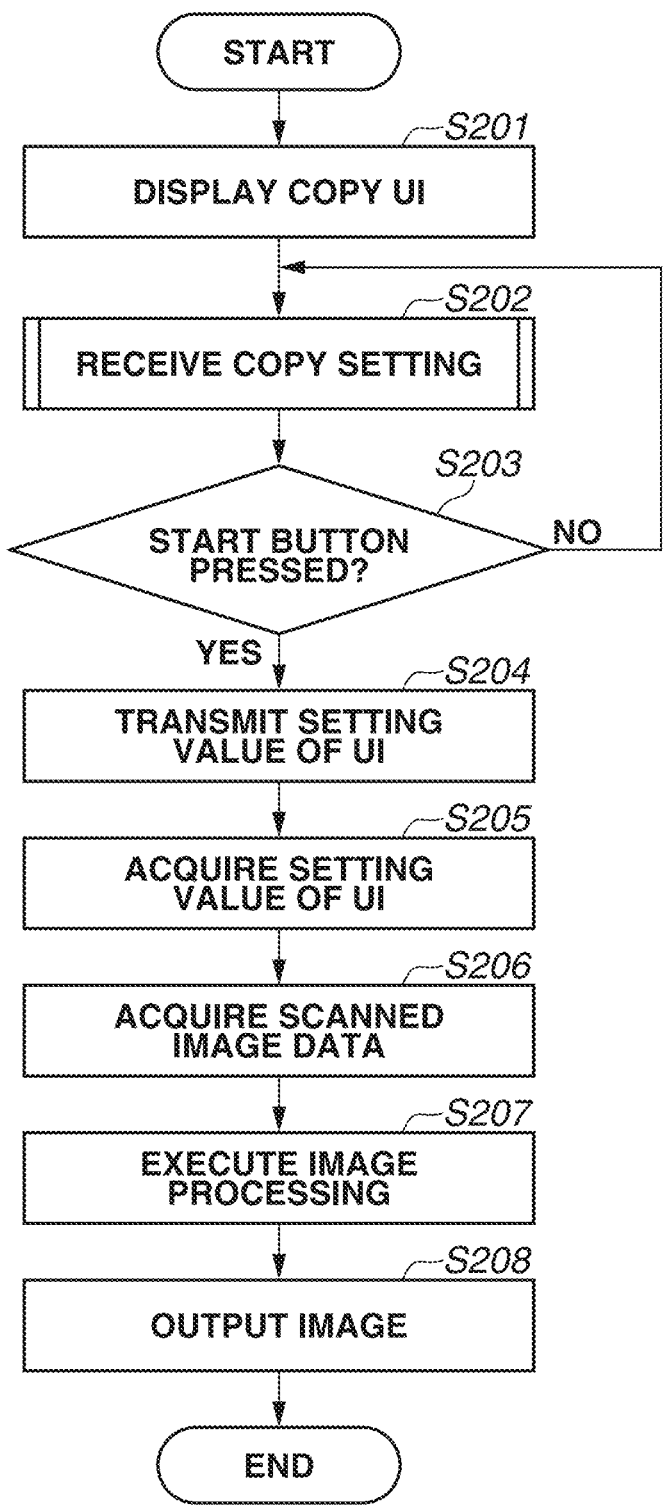
FIG. 2 is a flowchart illustrating copy processing according to a first exemplary embodiment.

FIG. 2 is a flowchart illustrating copy processing from UI display to printing, according to the first exemplary embodiment. The CPU 112 reads out a program stored in the ROM 113 or the storage device 105 into the RAM 111 and executes the read-out program, so that a part of operation in each process to be described below according to the present exemplary embodiment is implemented. S205 to S208 are performed by the show-through removal unit 107, the color conversion unit 108, the gamma correction unit 109, and the image conversion unit 110.

Figures 6A, 6B, 6C, 6D, 6E:
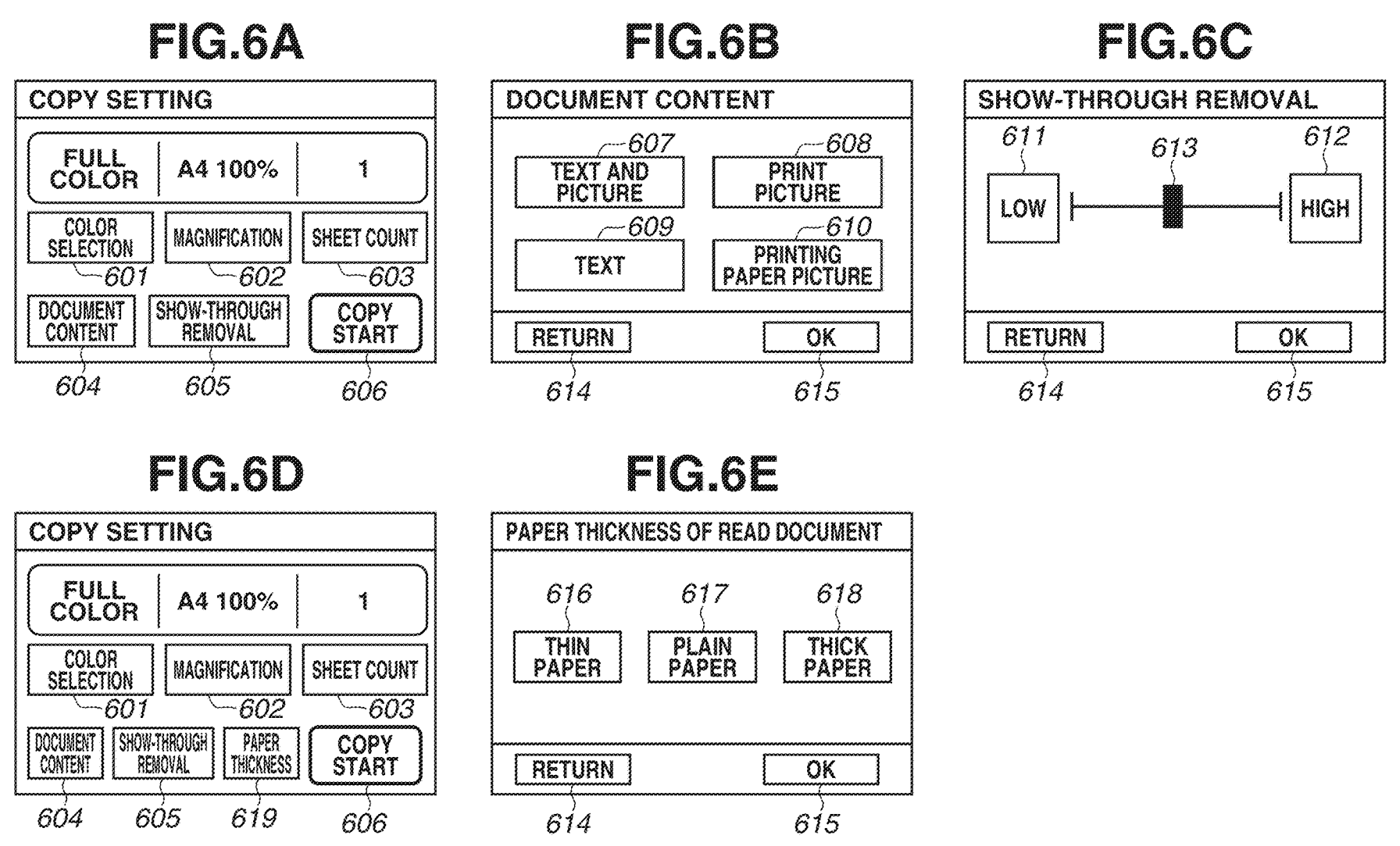

First, in S201, the CPU 112 displays a copy screen on the UI 103. FIG. 6A illustrates an example of the copy screen. Buttons related to basic settings for copy, such as a color selection button 601, a magnification button 602, and a sheet count button 603, are displayed on the screen in FIG. 6A. Further, a document content button 604 for setting the type of an image of a document and a show-through removal button 605 for setting an intensity of show-through removal are displayed on the copy screen in FIG. 6A. Furthermore, a copy start button 606 for starting copy after execution of necessary setting is displayed on the copy screen in FIG. 6A. In the present exemplary embodiment, the six setting buttons are described as buttons to be displayed, but examples of the display of the screen for the copy settings are not limited to this example, and other buttons may be displayed.

In S202, the CPU 112 receives a copy setting from the user via the copy screen. Among the buttons displayed on the UI 103, a button related to a necessary setting is selected by the user, and a necessary setting value is input in each setting screen displayed afterward. The CPU 112 stores the input setting value into the storage device 105.

Figure 3:
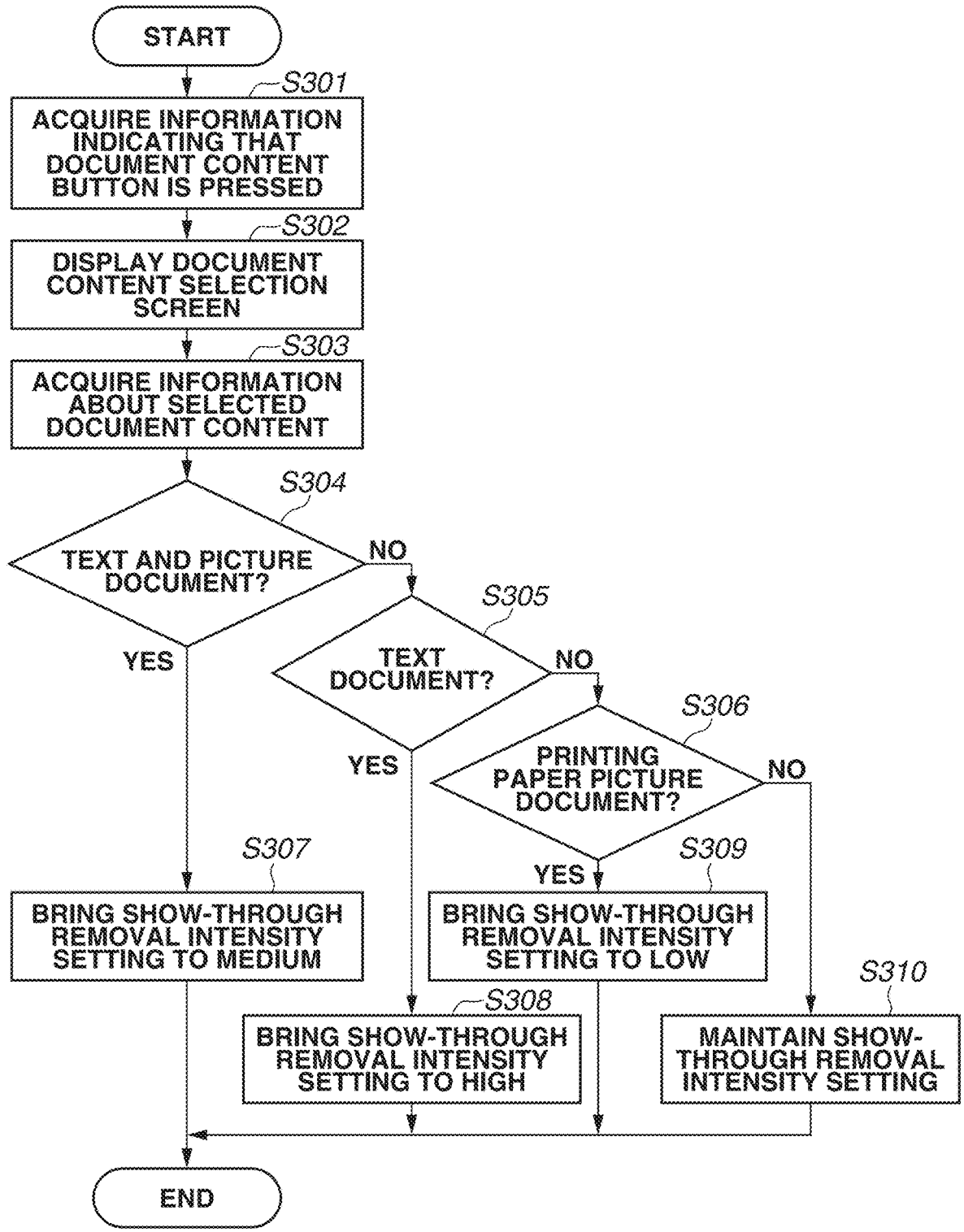
FIG. 3 is a flowchart illustrating show-through removal intensity setting processing according to the first exemplary embodiment.

Here, of the processing in S202, processing about document content setting and show-through removal intensity setting according to the first exemplary embodiment will be described with reference to a flowchart in FIG. 3. The CPU 112 reads out a program stored in the ROM 113 or the storage device 105 into the RAM 111, and executes the read-out program, so that each operation of the flowchart in FIG. 3 is implemented.

This processing is performed to automatically set the show-through removal intensity in association with the setting of the document content. As described above, the show-through removal intensity can be uniquely determined based on the document content. More specifically, in a case where the document content is a printing paper picture, the paper is thick and a show-through is less likely to occur, and thus the show-through removal intensity may be low. In a case where the document content is text, no adverse effect due to show-through removal occurs in a text portion, and thus the show-through removal intensity may be always high. Here, the adverse effect is a state where a phenomenon such as whiteout occurs because an area other than a show-through is also detected as a show-through area and the detected area is corrected, due to an excessively high show-through removal intensity. In a case where the document mainly includes text, the show-through removal intensity may be always high, because a text portion is not detected as a show-through even if the show-through intensity is high, and this will be described in detail below. In a case where the document content includes text and a picture, it is desirable that the show-through removal intensity is medium that can remove a show-through while preventing the above-described adverse effect, because text and a picture are mixed. The show-through removal intensity being high indicates that a correction amount for removing a show-through is large, and the show-through removal intensity being low indicates that a correction amount for removing a show-through is small.

First, a screen for setting the document content and a screen for setting the show-through removal intensity in the present exemplary embodiment will be described with reference to FIG. 6B and FIG. 6C, respectively. FIG. 6B is a screen displayed by the UI for setting the document content. The UI displays a text and picture button 607, a print picture button 608, a text button 609, and a printing paper picture button 610. However, the document content is not limited to this display. The print picture of the document content refers to a document mainly including a photographic image. The text of the document content refers to a document mainly including text. The text and picture refers to a document including text and a picture. The printing paper picture of the document content refers to a case where a document mainly includes a photographic image and is thick paper. When an OK button 615 is selected after a button for the document content to be set on the UI 103 is selected, the corresponding document content is set. The set document content is stored into the storage device 105 so that the CPU 112 can refer to the document content later. In a case where a return button 614 is pressed, the UI returns to the screen in FIG. 6A without changing the setting of the document content.

FIG. 6C illustrates the screen for setting the show-through removal intensity. In the present exemplary embodiment, the show-through removal intensity is described to have three levels of low, medium, and high, but the levels may not be three. For example, in a case where it is desirable to control the show-through removal intensity finely, four levels or five levels may be employed. A slider bar 613 is a show-through removal intensity setting bar that represents the current setting. The slider bar 613 moves leftward when a low button 611 is pressed and moves rightward when a high button 612 is pressed. A state where the slider bar 613 is located at the leftmost position corresponds to the show-through removal intensity being low. A state where the slider bar 613 is located at the center corresponds to the show-through removal intensity being medium. A state where the slider bar 613 is located at the rightmost position corresponds to the show-through removal intensity being high. When the OK button 615 is selected in a state where the slider bar 613 is moved at a desired position for the show-through removal intensity, the show-through removal intensity is set to the corresponding level. For example, when the OK button 615 is selected in a state where the slider bar 613 is located to the leftmost position after the low button 611 is selected once in a state in FIG. 6C, the show-through removal intensity is set to low. The set show-through removal intensity is stored into the storage device 105 so that the CPU 112 can refer to the set show-through removal intensity later. In a case where the return button 614 is pressed, the current screen returns to the screen in FIG. 6A without changing the setting of the show-through removal intensity.

Next, the content of the processing will be described. First, in S301, the CPU 112 acquires information indicating that the document content button 604 is pressed by the user.

Subsequently, in S302, the CPU 112 displays the screen for selecting the document content on the UI 103.

Next, in S303, the CPU 112 acquires information about a button selected by the user among the buttons of the document content displayed in S302.

Subsequently, in S304, the CPU 112 determines whether the setting of the document content is a text and picture document, based on the information acquired in S303.

If the CPU 112 determines that the setting of the document content is a text and picture document (YES in S304), the processing proceeds to S307. In S307, the CPU 112 brings the show-through removal intensity setting to medium.

If the CPU 112 determines that the setting of the document content is not a text and picture document (NO in S304), the processing proceeds to S305. In S305, the CPU 112 determines whether the setting of the document content is a text document.

If the CPU 112 determines that the setting of the document content is a text document (YES in S305), the processing proceeds to S308. In S308, the CPU 112 brings the show-through removal intensity setting to high.

If the CPU 112 determines that the setting of the document content is not a text document (NO in S305), the processing proceeds to S306. In S306, the CPU 112 determines whether the setting of the document content is a printing paper picture document, based on the information acquired in S303.

If the CPU 112 determines that the setting of the document content is a printing paper picture document (YES in S306), the processing proceeds to S309. In S309, the CPU 112 brings the show-through removal intensity setting to low.

If the CPU 112 determines that the setting of the document content is not a printing paper picture document (NO in S306), the processing proceeds to S310. In S310, the CPU 112 leaves the setting of the show-through removal intensity unchanged.

Referring back to FIG. 2, in S203, the CPU 112 determines whether the copy start button 606 in FIG. 6A is selected (pressed). If the CPU 112 determines that the copy start button 606 is not selected (NO in S203), receiving the copy setting in S202 continues.

If the CPU 112 determines that the copy start button 606 is selected (YES in S203), the processing proceeds to S204. In S204, the CPU 112 reads out the copy setting made via the copy screen from the storage device 105, and transmits the read-out copy setting to the image data acquisition unit 106.

In S205, The CPU 112 acquires the copy setting transmitted in S204 and stores the acquired copy setting into the RAM 111.

Subsequently, in S206, the image data acquisition unit 106 acquires RGB image data generated from a document read by the scanner 102, and stores the acquired RGB image data into the RAM 111.

Next, in S207, the show-through removal unit 107, the color conversion unit 108, and the gamma correction unit 109 each perform image processing on the RGB image data stored into the RAM 111 in S206. The show-through removal unit 107 performs processing on a show-through area of the RGB image data input from the image data acquisition unit 106, and generates the RGB image data from which a show-through has been removed. The color conversion unit 108 converts each pixel value of the RGB image data generated by the show-through removal unit 107 into a corresponding CMYK value and thereby generates CMYK image data. Interpolation calculation using a LUT is performed for the conversion of each pixel from RGB to CMYK. On the CMYK image data sent from the color conversion unit 108, the gamma correction unit 109 performs correction processing for keeping the tone characteristics in the print engine 104 constant. Finally, in S208, the image conversion unit 110 controls conversion of the CMYK image data generated in S207 into N-bit (N: an integer) half-tone image data suitable for the printer, and transmission of the half-tone image data to the print engine 104.

Figure 4:
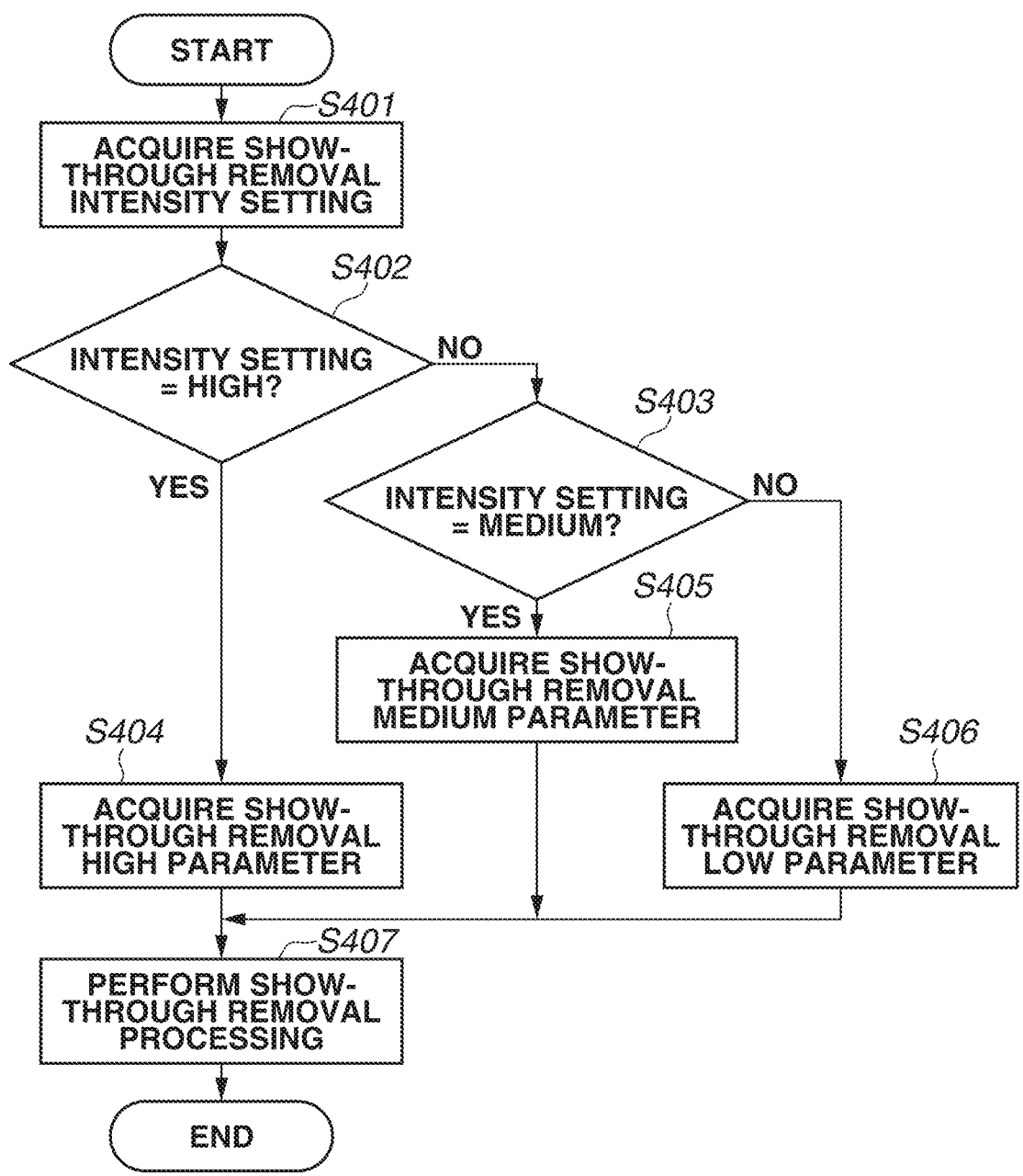
FIG. 4 is a flowchart illustrating show-through removal parameter acquisition processing according to the first exemplary embodiment.
Figure 5:
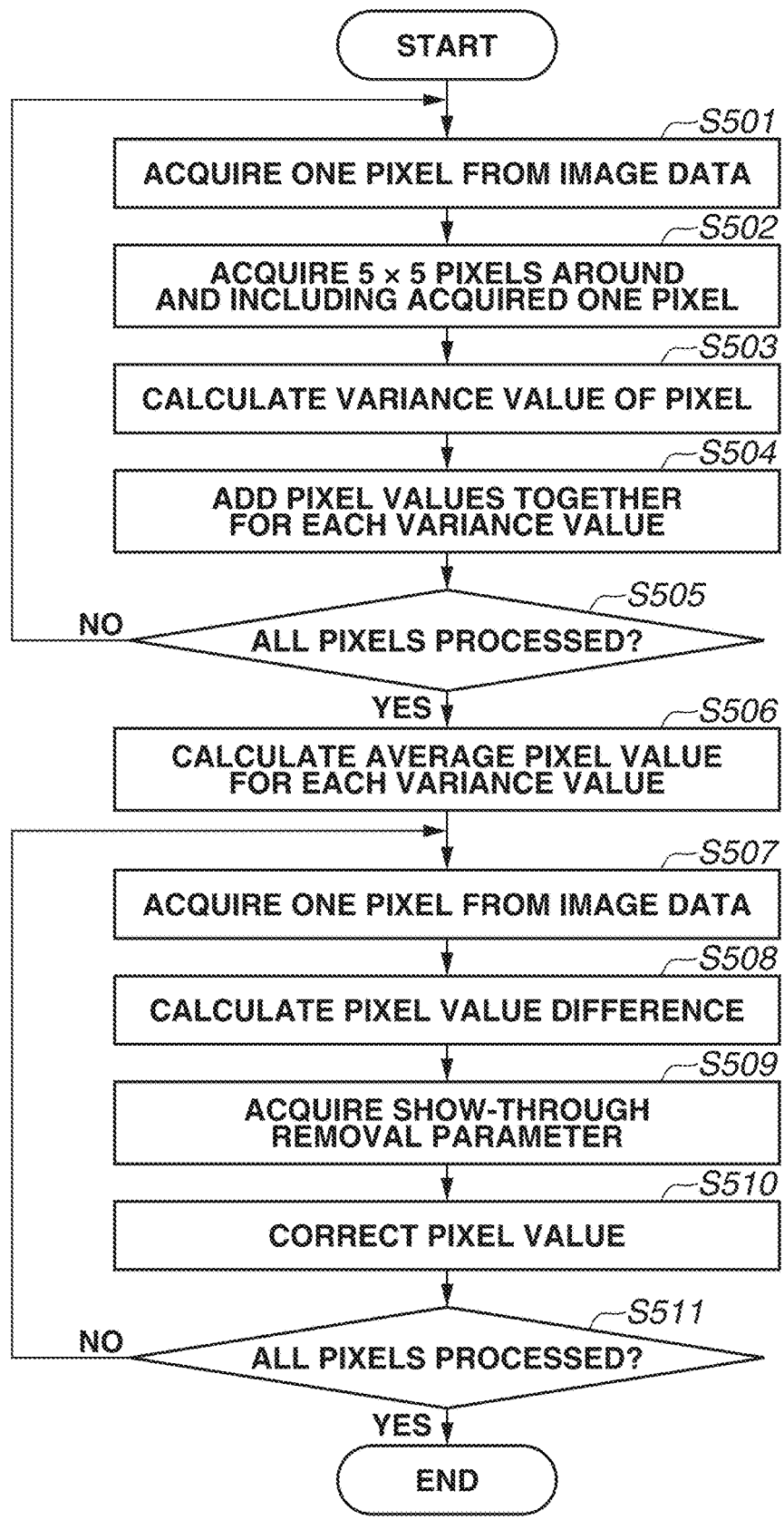
FIG. 5 is a flowchart illustrating details of show-through removal processing according to the first exemplary embodiment.

Here, the show-through removal processing performed by the show-through removal unit 107 will be described with reference to flowcharts in FIG. 4 and FIG. 5. The show-through removal unit 107 performs all the processing in FIG. 4 and FIG. 5.

First, in S401, the show-through removal unit 107 acquires the show-through removal intensity setting among the setting values stored into the RAM 111 in S205.

Subsequently, in S402, the show-through removal unit 107 determines whether the show-through removal intensity setting acquired in S401 is high.

If the show-through removal unit 107 determines that the show-through removal intensity setting is high (YES in S402), the processing proceeds to S404. In S404, the show-through removal unit 107 acquires a show-through removal intensity setting high parameter, among show-through removal parameters stored in the storage device 105 beforehand, and stores the acquired parameter into the RAM 111.

If the show-through removal unit 107 determines that the show-through removal intensity setting is not high (NO in S402), the processing proceeds to S403. In S403, the show-through removal unit 107 determines whether the show-through removal intensity setting acquired in S401 is medium.

If the show-through removal unit 107 determines that the show-through removal intensity setting is medium (YES in S403), the processing proceeds to S405. In S405, the show-through removal unit 107 acquires a show-through removal intensity setting medium parameter among the show-through removal parameters stored in the storage device 105 beforehand, and stores the acquired parameter into the RAM 111.

If the show-through removal unit 107 determines that the show-through removal intensity setting is not medium (NO in S403), the processing proceeds to S406. In S406, the show-through removal unit 107 acquires a show-through removal intensity setting low parameter among the show-through removal parameters stored in the storage device 105 beforehand, and stores the acquired parameter into the RAM 111.

Finally, in S407, the show-through removal unit 107 performs the show-through removal processing, using the show-through removal parameter stored into the RAM 111 in S404, S405, or S406.

Next, the show-through removal processing will be described in detail with reference to the flowchart in FIG. 5.

The show-through removal unit 107 uses the RGB image data stored into the RAM 111 in S206 to calculate an average pixel value for each variance value in S501 to S506. Further, the show-through removal unit 107 uses the RGB image data again to correct each pixel in S507 to S511.

First, in S501, the show-through removal unit 107 acquires one pixel (a target pixel) from the RGB image data acquired in S206.

Figure 7:
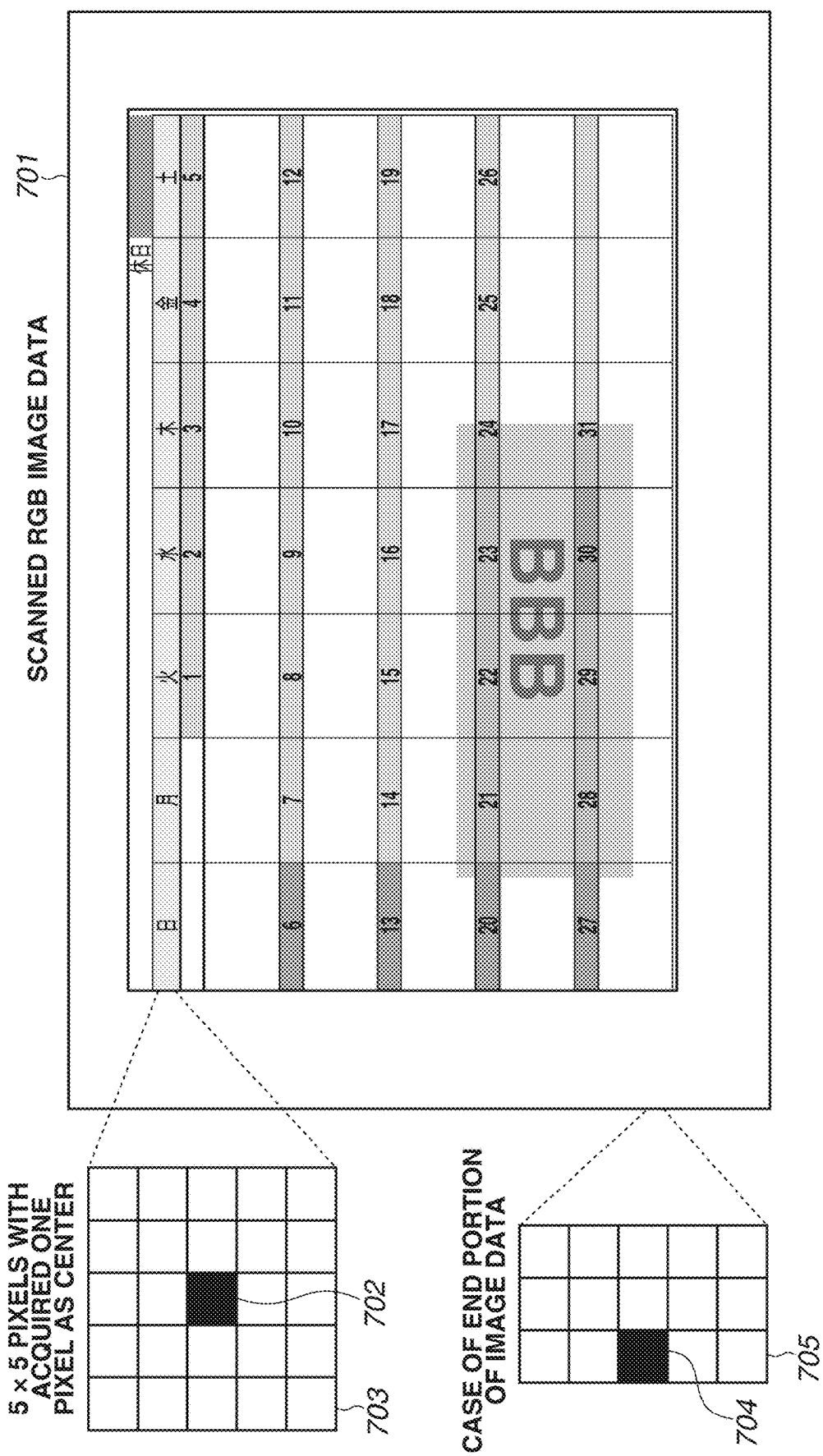
FIG. 7 is a conceptual diagram illustrating a pixel group to be acquired from image data.

Next, in S502, the show-through removal unit 107 acquires 5×5 pixels (25 pixels including the target pixel) with the pixel acquired in S501 as a center, from the RGB image data. FIG. 7 is a conceptual diagram illustrating the 5×5 pixels acquired from the RGB image data. For example, as illustrated in FIG. 7, the show-through removal unit 107 acquires twenty-four pixels 703 around a target pixel 702 acquired from the RGB image data 701. In a case where the target pixel is located at an end portion of the image data, the RGB value of a nonexistent pixel is treated as 0. For example, in a case where the target pixel is located at a left end portion of the image data as a pixel 704 illustrated in FIG. 7, no pixel is present on the left side of the target pixel, and therefore the RGB value of each of nonexistent 2×5 pixels is treated as 0. In the present exemplary embodiment, the number of pixels to be acquired is 25 (5×5 pixels), but is not limited to this number, and may be changed depending on, for example, the size of the image data.

Subsequently, in S503, the show-through removal unit 107 calculates a variance value of the target pixel, from the target pixel and the surrounding pixels acquired in S501 and S502. The variance value of the target pixel is calculated for each of R, G, and B. The following equation (1) is used for the calculation of the variance value.

$$\sigma r[n] = \sqrt{\left(\sum_{i=1}^{N}(xri - \mu r)^2 / N\right)} \quad (1)$$

$$\sigma g[n] = \sqrt{\left(\sum_{i=1}^{N}(xgi - \mu g)^2 / N\right)}$$

$$\sigma b[n] = \sqrt{\left(\sum_{i=1}^{N}(xbi - \mu b)^2 / N\right)}$$

In the equation (1), σr[n] represents a variance value of an nth pixel of R of the mage data, xri represents an ith pixel value of R within the 5×5 pixels, pr represents a pixel average value of R of the 5×5 pixels, and N represents the total number of pixels (25). Similarly, σg[n] represents a variance value of an nth pixel of G of the mage data, σb[n] represents a variance value of an nth pixel of B of the mage data, xgi represents an ith pixel value of G, xbi represents an ith pixel value of B, μg represents a pixel average value of G, and μb represents a pixel average value of B. Further, Σ represents the calculation of a total sum.

Next, in S504, the values of pixels having the same variance value are added together for each of R, G, and B, based on the variance value calculated in S503. This is given by the following equation (2).

$$Tr[\sigma r[n]] = Tr[\sigma r[n]] + Pr$$

$$Tg[\sigma g[n]] = Tg[\sigma g[n]] + Pg$$

$$Tb[\sigma b[n]] = Tb[\sigma b[n]] + Pb \quad (2)$$

Tr represents an array that holds the sum of pixel values of R for each variance value, and the initial value is 0. Pr represents a pixel value of R of the target pixel. Similarly, Tg represents an array that holds the sum of pixel values of G for each variance value, and Tb represents an array that holds the sum of pixel values of B for each variance value, and for both, the initial value is 0. Further, Pg represents a pixel value of G of the target pixel, and Pb represents a pixel value of B of the target pixel. For each variance value and each of R, G, and B values, the number of applicable pixels is counted. This is given by the following equation (3).

$$Cr[\sigma r[n]] = Cr[\sigma r[n]] + 1$$

$$Cg[\sigma g[n]] = Cg[\sigma g[n]] + 1$$

$$Cg[\sigma b[n]] = Cg[\sigma b[n]] + 1 \quad (3)$$

Cr represents an array that holds the sum of pixels of R for each variance value, and the initial value is 0. Similarly, Cg represents an array that holds the sum of pixels of G for each variance value, and Cb represents an array that holds the sum of pixels of B for each variance value, and for both, the initial value is 0.

Subsequently, in S505, the show-through removal unit 107 determines whether all the pixels of the RGB image data acquired in S501 are processed. The determination as to whether all the pixels are processed may be performed by providing each pixel with a flag that represents whether the pixel is processed and determining whether the flags of all the pixels indicate the pixels being processed. Alternatively, the determination may be performed by storing the number of all the pixels when the image data is acquired, and determining whether the processing is repeated for the number of all the pixels. If all the pixels are not processed (NO in S405), the processing returns to S501.

If the show-through removal unit 107 determines that all the pixels are processed (YES in S405), the processing proceeds to S506. In S506, the show-through removal unit 107 calculates an average pixel value for each variance value of each of R, G, and B, from the sum of the pixel values for each variance value calculated in S504 and the total number of pixels. The calculation of the average pixel value is performed by using the following equation (4).

$$Aver[\sigma r[n]] = Tr[\sigma r[n]]/Cr[\sigma r[n]]]$$

$$Aveg[\sigma g[n]] = Tr[\sigma g[n]]/Cr[\sigma g[n]]]$$

$$Aveb[\sigma b[n]] = Tr[\sigma b[n]]/Cr[\sigma b[n]]] \quad (4)$$

Aver represents an average pixel value for each variance value of R, Aveg represents an average pixel value for each variance value of G, and Aveb represents an average pixel value for each variance value of B.

Subsequently, in S507, the show-through removal unit 107 acquires one pixel (a target pixel) from the RGB image data acquired in S206.

Next, in S508, the show-through removal unit 107 calculates the absolute value of the difference between the pixel value of the target pixel and the average pixel value corresponding to the variance value of the target pixel. The difference is calculated by using the following equation (5).

$$Dr[n] = abs(Zr[n] - Aver[\sigma r[n]])]$$

$$Dg[n] = abs(Zg[n] - Aveg[\sigma g[n]])]$$

$$Db[n] = abs(Zb[n] - Aveb[\sigma b[n]])] \quad (5)$$

Dr represents the absolute value of the difference of R, and Zr represents a pixel value of R. Further, n represents an nth pixel. Similarly, Dg represents the absolute value of the difference of G, and Db represents the absolute value of the difference of B. Zg represents a pixel value of G, and Zb represents a pixel value of B. The value of each of Dr, Dg, and Db is equivalent to a correction amount for show-through removal to be used in S510.

Subsequently, in S509, the show-through removal unit 107 acquires the show-through removal parameter stored into the RAM 111 in S404, S405, or S406. The show-through removal parameter is a value for controlling a correction amount for each pixel of a show-through area, based on the show-through removal intensity. More specifically, the show-through removal parameter is a value that represents what percentage of the correction amount for the value of each of R, G, and B of a target pixel is to be added. For example, in a case where 20% of the correction amount is to be added to the RGB value of the target pixel in a case where the show-through removal intensity is low, the show-through removal parameter has a value of 0.2. A variation in this value is a difference in the processing between selections of the respective high, medium, and low levels of the show-through removal intensity, and this controls the degree of removal of a show-through area and an influence on areas except for the show-through area.

Next, in S510, the show-through removal unit 107 corrects the pixel value using the differential value calculated in S508 and the show-through removal parameter acquired in S509. The pixel value is corrected by using the following equation (6).

$$M = Min(Dr[n], Dg[n], Db[n]))$$

$$Xmr[n] = Zr[n] + (M \times Ep)]$$

$$Xmg[n] = Zg[n] + (M \times Ep)]$$

$$Xmb[n] = Zb[n] + (M \times Ep)] \quad (6)$$

M has the smallest value among the values Dr, Dg, and Db calculated in S508 (Min represents a function that outputs a minimum value). Ep is the show-through removal parameter acquired in S509. Xmr represents a post-correction pixel value of R, and n represents an nth pixel. Similarly, Xmg represents a post-correction pixel value of G, and Xmb represents a post-correction pixel value of B.

Subsequently, in S511, the show-through removal unit 107 determines whether all the pixels of the RGB image data acquired in S206 are processed. The determination as to whether all the pixels are processed may be performed by providing each pixel with a flag representing whether the pixel is processed and determining whether the flags of all the pixels indicate the pixels being processed. Alternatively, the determination may be performed by storing the number of all the pixels when the image data is acquired, and determining whether the processing is repeated for the number of all the pixels. If all the pixels are not processed (NO in S511), the processing returns to S507. If all the pixels are processed (YES in S511), the processing ends.

Performing the above-described processing makes it possible to set an appropriate correction amount for the show-through, even if the user does not appropriately recognize the relationship between the setting of the type of the image of the document and the correction amount for the show-through. More specifically, because the show-through removal intensity is automatically set based on the type of the image of the document, it is possible to prevent an inappropriate setting state where an adverse effect of a show-through occurs, such as the loss of a bright portion that is not a show-through, or the presence of a show-through remaining without being completely removed. In addition, because the show-through removal intensity is automatically set based on the content of the document, it is not necessary to set the intensity twice, and this improves usability.

In the present exemplary embodiment, the show-through removal parameter is described to have only the value for controlling the correction amount. However, a plurality of parameters for controlling a value related to the show-through removal processing such as the range of the pixels to be acquired in S502 may be provided.

In the first exemplary embodiment, the show-through removal intensity set based on the document content is directly applied to the show-through removal processing. However, there is a case where the user wants to change the show-through removal intensity after the show-through removal intensity is set based on the document content. For example, in a case where the most part of a document is text and a picture is present in a small area of the document, it is desirable to set the content of the document as text. In this case, however, the picture may be affected if the show-through removal intensity is set to high, and therefore the user may want to change the show-through removal intensity to medium. Nevertheless, it is necessary to avoid a state where the show-through removal intensity is not appropriately set for the document content, which is regarded as an issue. Thus, in a second exemplary embodiment, there will be described a method of disabling setting the show-through removal intensity to a level inappropriate for the document content, while enabling the user to change the show-through removal intensity from the UI 103, after the show-through removal intensity is set based on the document content. The second exemplary embodiment is different from the first exemplary embodiment only in the processing in FIG. 3, and therefore other processing will not be described.

Figure 8:
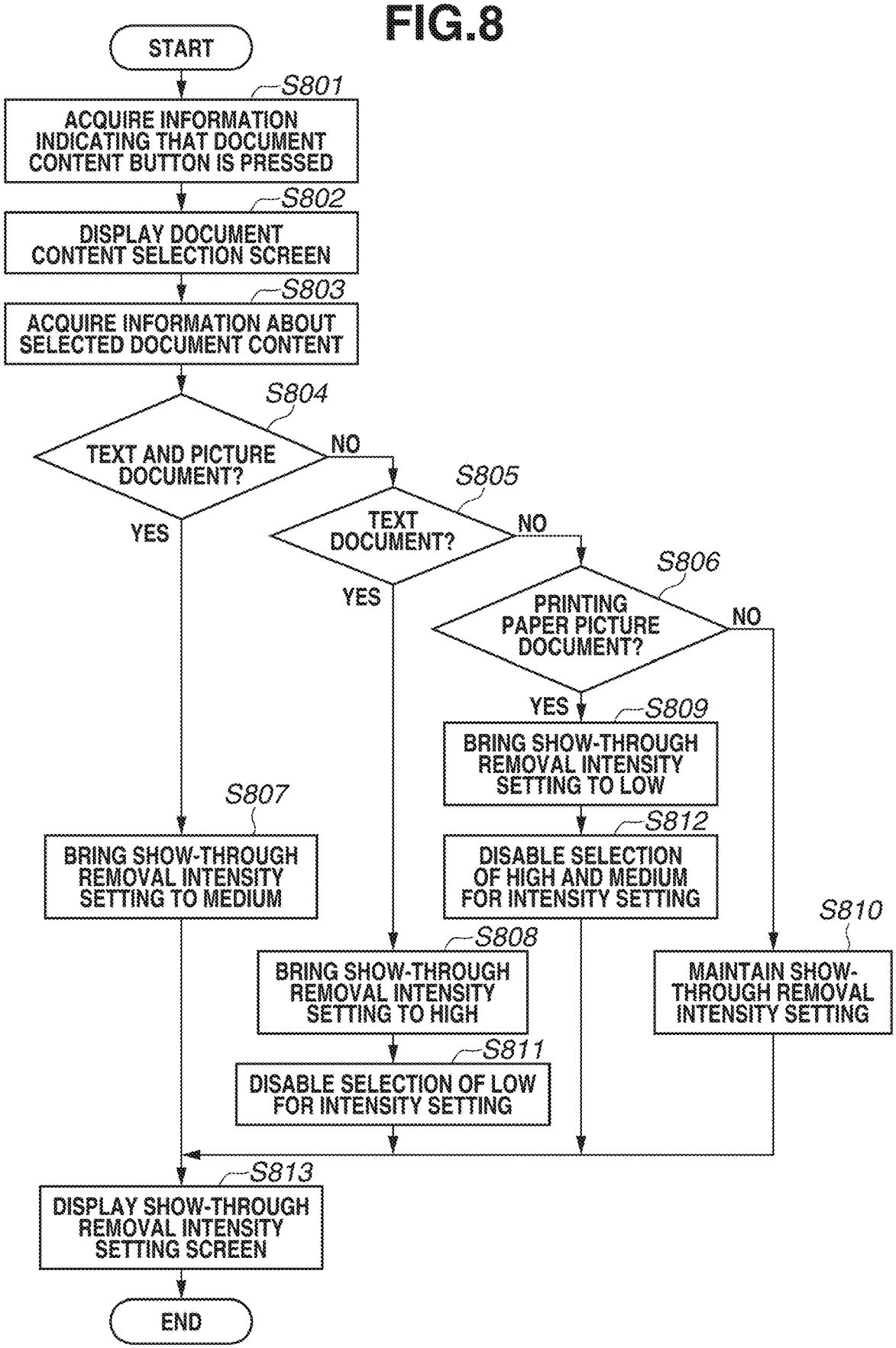
FIG. 8 is a flowchart illustrating show-through removal intensity setting processing according to a second exemplary embodiment.

The processing according to the present exemplary embodiment will be described with reference to FIG. 8. FIG.

8 is a flowchart illustrating the show-through removal intensity setting according to the second exemplary embodiment. The CPU 112 reads out a program stored in the ROM 113 or the storage device 105 into the RAM 111, and executes the read-out program, so that each of the flowchart in FIG. 8 is implemented.

S801 to S810 are similar to S301 to S310 in FIG. 3 and therefore will not be described in detail.

If the CPU 112 determines that the setting of the document content is a text document (YES in S805), the processing proceeds to S808. In S808, the CPU 112 sets the show-through removal intensity to high. Subsequently, in S811, the CPU 112 disables setting the show-through removal intensity to low. More specifically, in a case where the show-through removal intensity setting bar (the slider bar) 613 in FIG. 6C is located at the center, pressing the low button 611 is disabled. Bringing the show-through intensity setting to low is thereby disabled.

If the CPU 112 determines that the setting of the document content is a printing paper picture document (YES in S806), the processing proceeds to S809. In S809, the CPU 112 sets the show-through removal intensity to low. Subsequently, in S812, the CPU 112 disables setting the show-through removal intensity to high and medium. More specifically, in a state where the show-through removal intensity setting bar 613 in FIG. 6C is located at the leftmost position (low), selecting the high button 612 is disabled. Bringing the show-through intensity setting to high and medium is thereby disabled. In other words, the screen is controlled so that a correction amount for a show-through in a case where the thickness of a designated document is a first thickness is smaller than a correction amount for a show-through in a case where the thickness of a designated document is a second thickness less than the first thickness.

After the show-through removal intensity is set in S807 or S810, or after the show-through removal intensity is set in S808 or S809 and then the target setting is disabled in S811 or S812, the CPU 112 displays the screen for setting the show-through removal intensity in S813.

Performing the above-described processing makes it possible to disable setting the show-through removal intensity to a level inappropriate for the document content, while enabling the user to change the show-through removal intensity from the UI 103, after the show-through removal intensity is set based on the document content.

In the first exemplary embodiment, the show-through removal intensity is set only based on the document content. However, the darkness of the show-through is greatly affected by a difference in paper thickness of the document. Accordingly, in a third exemplary embodiment, there will be described a method of setting the show-through removal intensity based on the paper thickness of the document that is one of the setting items for copy, and the setting of the document content. The third exemplary embodiment is different from the first exemplary embodiment only in the processing in the flowchart in FIG. 3, and therefore other processing will not be described.

Figure 9:
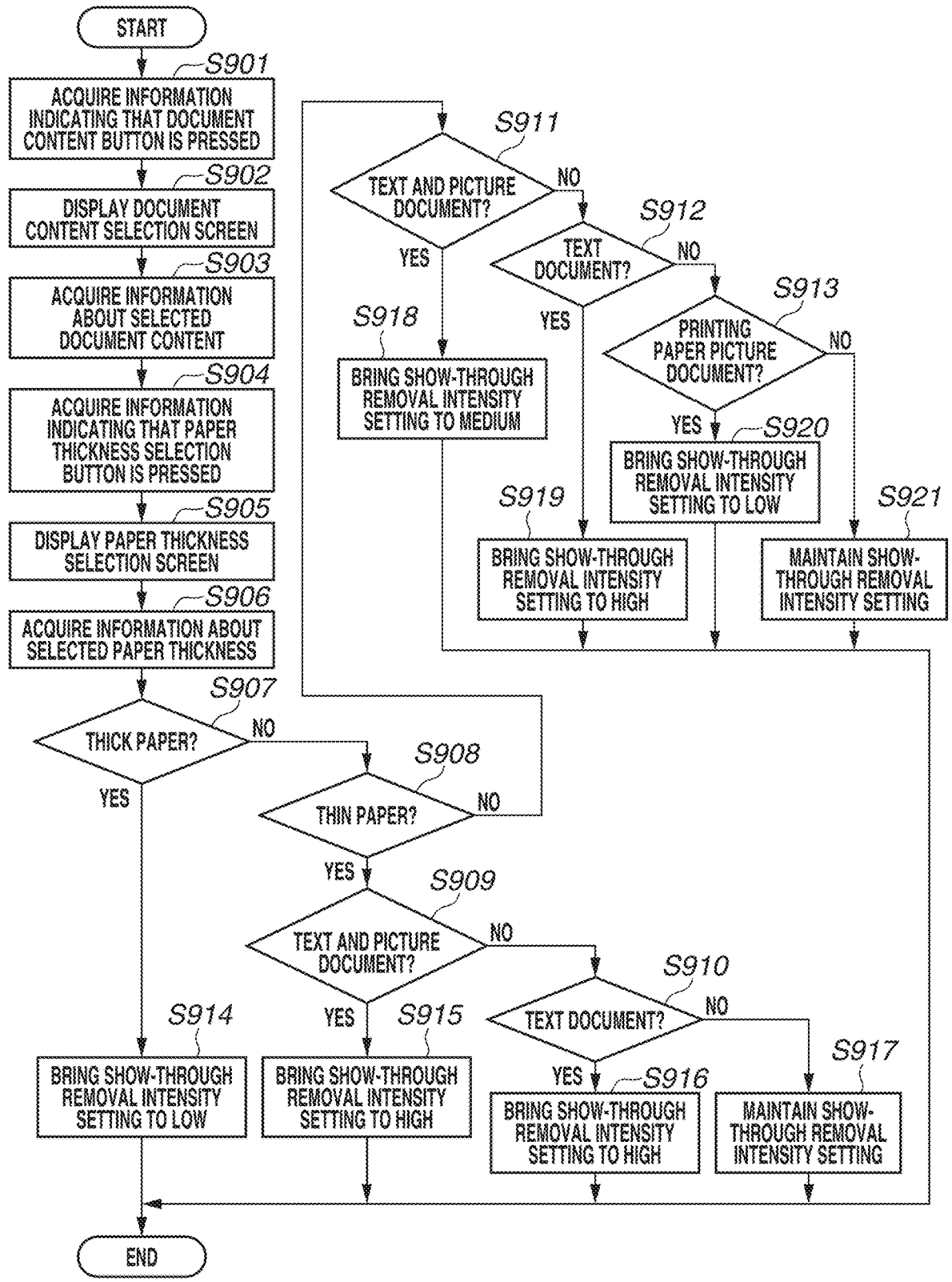
FIG. 9 is a flowchart illustrating show-through removal intensity setting processing according to a third exemplary embodiment.

The processing of the present exemplary embodiment will be described with reference to FIG. 9. FIG. 9 is a flowchart illustrating the show-through removal intensity setting according to the third exemplary embodiment. The CPU 112 reads out a program stored in the ROM 113 or the storage device 105 into the RAM 111, and executes the read-out program, so that each operation of the flowchart in FIG. 9 is implemented.

S901 to S903 are similar to S301 to S303 in FIG. 3 and therefore will not be described.

In S904, the CPU 112 acquires information indicating that a paper thickness selection button 619 in FIG. 6D is pressed by the user.

Subsequently, in S905, the CPU 112 displays a screen for designating a paper thickness on the UI 103. The UI displays, for example, a thin paper button 616, a plain paper button 617, and a thick paper button 618 as illustrated in FIG. 6E.

Next, in S906, the CPU 112 acquires information about a button selected by the user among the buttons for selecting the paper thickness displayed in S905.

Subsequently, in S907, the CPU 112 determines whether the setting of the paper thickness is thick paper, based on the information acquired in S906.

If the CPU 112 determines that the setting of the paper thickness is thick paper (YES in S907), the processing proceeds to S914. In S914, the CPU 112 sets the show-through removal intensity to low.

If the CPU 112 determines that the setting of the paper thickness is not thick paper (NO in S907), the processing proceeds to S908. In S908, the CPU 112 determines whether the setting of the paper thickness is thin paper.

If the CPU 112 determines that the setting of the paper thickness is thin paper (YES in S908), the processing proceeds to S909. In S909, the CPU 112 determines whether the setting of the document content is a text and picture document, based on the information acquired in S903.

If the CPU 112 determines that the setting of the document content is a text and picture document (YES in S909), the processing proceeds to S915. In S915, the CPU 112 sets the show-through removal intensity to high.

If the CPU 112 determines that the setting of the document content is not a text and picture document (NO in S909), the processing proceeds to S910. In S910, the CPU 112 determines whether the setting of the document content is a text document, based on the information acquired in S903.

If the CPU 112 determines that the setting of the document content is a text document (YES in S910), the processing proceeds to S916. In S916, the CPU 112 sets the show-through removal intensity to high.

If the CPU 112 determines that the setting of the document content is not a text document (NO in S910), the processing proceeds to S917. In S917, the CPU 112 leaves the setting of the show-through removal intensity unchanged.

If the CPU 112 determines that the setting of the paper thickness is not thin paper (NO in S908), the processing in and after S911 is performed. The processing in and after S911 is similar to the processing in and after S304 in FIG. 3 and therefore will not be described.

Performing the above-described processing makes it possible to set the show-through removal intensity based on the paper thickness of the document and the setting of the document content. Therefore, the show-through removal intensity is automatically set based on the paper thickness of the document as well.

Other Exemplary Embodiments

Some embodiments can also be implemented by supplying a program that implements one or more functions of the above-described exemplary embodiments to a system or apparatus via a network or storage medium, and causing one or more processors in a computer of the system or apparatus to execute processing by reading out the program. Some embodiments can also be implemented by a circuit (e.g., an application-specific integrated circuit (ASIC)) for implementing one or more functions.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that various embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-229970, which was filed on Dec. 7, 2018 and which is hereby incorporated by reference herein in its entirety.

What is claimed is:

1. An image processing apparatus comprising:
a user interface that receives a type of a content of a document sheet;
a reader that reads a first side of the document sheet and a second side of the document sheet; and
a controller or a circuit that reduces, using a parameter, a show-through of an image generated by reading the second side of the document sheet by the reader,
wherein the controller or the circuit sets, based on at least the type of the content received by the user interface, the parameter so that an amount of reduction of the show-through is larger in a case where the type of the content received by the user interface is text than in a case where the type of the content received by the user interface is a certain type which is other than the text.

2. The image processing apparatus according to claim 1, wherein the certain type is a printing paper picture.

3. The image processing apparatus according to claim 2, wherein the controller or the circuit sets the parameter so that the amount of reduction of the show-through is larger in a case where the type of the content received by the user interface is text than in a case where the type of the content received by the user interface is a picture.

4. The image processing apparatus according to claim 1, wherein the controller or the circuit sets the parameter so that the amount of reduction of the show-through is larger in a case where the type of the content received by the user interface is text than in a case where the type of the content received by the user interface is a mixture of text and a picture.

5. The image processing apparatus according to claim 1, wherein the user interface further receives a thickness of the document sheet, and
wherein the controller or the circuit sets the parameter based on the type of the content of the document sheet received by the user interface and the thickness of the document sheet received by the user interface.

6. The image processing apparatus according to claim 5, wherein the controller or the circuit sets the parameter so that the amount of reduction of the show-through is smaller in a case where the type of the content received by the user interface is a certain type and the thickness of the document sheet received by the user interface is a predetermined thickness or more than in a case where the type of the content received by the user interface is the certain type and the thickness of the document received by the user interface is less than the predetermined thickness.

7. The image processing apparatus according to claim 1, wherein the controller or the circuit calculates a variance value from a pixel value of a target pixel and pixel values of respective pixels around the target pixel of an image of the first side of the document sheet from the image of the document sheet, calculates an average pixel value of pixels having a same variance value for each variance value among pixels of the image of the first side of the document sheet, weights a difference between the pixel value of the target pixel and an average pixel value corresponding to a variance value of the target pixel, based on the type of the content received by the user interface, adds the weighted difference to the pixel value of the target pixel, and thereby reduces the show-through of the image generated by reading the second side of the document sheet.

8. The image processing apparatus according to claim 1, wherein the controller or the circuit changes a correction amount for a RGB value to be added to the image of the document sheet.

9. The image processing apparatus according to claim 1, wherein the reader reads each side of the document sheet while the document sheet is conveyed once.

10. The image processing apparatus according to claim 1, further comprising a printer that prints the image to which the image process is performed by the controller or the circuit.

11. The image processing apparatus according to claim 1, further comprising a communicator that transmits the image to which the image process is performed by the controller or the circuit.

12. An image processing method comprising:
receiving a type of a content of a document sheet;
reading a first side of the document sheet and a second side of the document sheet; and
reducing, using a parameter, a show-through of an image generated by reading the second side of the document sheet,
wherein the parameter is set based on at least the received type of the content so that an amount of reduction of the show-through is larger in a case where the received type of the content is text than in a case where the received type of the content is a certain type which is other than the text.

13. A non-transitory computer-readable storage medium storing a program that causes a computer to execute an image processing method, the image processing method comprising:
- receiving a type of a content of a document sheet;
- reading a first side of the document sheet and a second side of the document sheet; and
- reducing, using a parameter, a show-through of an image generated by reading the second side of the document sheet,
- wherein the parameter is set based on at least the received type of the content so that an amount of reduction of the show-through is larger in a case where the received type of the content is text than in a case where the received type of the content is a certain type which is other than the text.

14. An image processing apparatus comprising:
- a reader that reads a first side of a document sheet and a second side of the document sheet; and
- a controller or a circuit that reduces, using a parameter, a show-through of an image generated by reading the second side of the document sheet by the reader,
- wherein the controller or the circuit sets, based on at least the type of the content of the document sheet, the parameter so that an amount of reduction of the show-through is larger in case where the type of the content received by a user interface is text than in a case where the type of the content received by the user interface is a certain type which is other than the text.

* * * * *